United States Patent
Lin et al.

(10) Patent No.: US 11,435,658 B2
(45) Date of Patent: Sep. 6, 2022

(54) PROJECTION MODULE, IMAGING MODULE, AND ELECTRONIC DEVICE

(71) Applicant: TRIPLE WIN TECHNOLOGY (SHENZHEN) CO. LTD., Shenzhen (CN)

(72) Inventors: Shih-Che Lin, Shenzhen (CN); Tao Wang, Shenzhen (CN); Yong-Bo Luo, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/351,468

(22) Filed: Jun. 18, 2021

(65) Prior Publication Data
US 2021/0397074 A1  Dec. 23, 2021

(30) Foreign Application Priority Data
Jun. 19, 2020  (CN) .......................... 202010569022.5

(51) Int. Cl.
*G03B 21/20* (2006.01)
*H04N 9/31* (2006.01)
*G03B 21/28* (2006.01)

(52) U.S. Cl.
CPC ......... *G03B 21/2033* (2013.01); *G03B 21/28* (2013.01); *H04N 9/31* (2013.01)

(58) Field of Classification Search
CPC ...... G03B 21/14; G03B 21/28; G03B 21/145; G03B 21/147; G03B 21/208; G03B 21/2013; G03B 21/2033; G03B 21/2053; G03B 21/2073; H01S 5/183; H01S 5/423; G06T 7/506; G06T 7/521; G02B 27/0114; G02B 27/30; G02B 27/106; G02B 27/141; G02B 27/425; G02B 27/283; G02B 27/1086; H04N 9/31; H04N 9/3155; H04N 9/3161; H04N 9/3164; H04N 9/3194

See application file for complete search history.

(56) References Cited

U.S. PATENT DOCUMENTS

| 8,113,660 B1 * | 2/2012 | Troyer | H04N 9/3129 353/31 |
| 8,405,823 B2 * | 3/2013 | Pfaff | G01R 31/311 250/339.05 |

(Continued)

FOREIGN PATENT DOCUMENTS

TW   I689752 B   4/2020

*Primary Examiner* — Sultan Chowdhury
(74) *Attorney, Agent, or Firm* — ScienBiziP, P.C.

(57) ABSTRACT

A projection module includes a light source, a reflective structure, and an optical structure. The light source emits laser light. The reflective structure includes a first reflective element and a second reflective element. The optical structure includes a first optical element and a second optical element. The reflective structure is disposed between the laser source and the optical structure. The first reflective element reflects a portion of the laser light towards the second reflective element, and transmits a remaining portion of the laser light towards the second optical element. The second reflective element reflects the laser light from the first reflective element towards the first optical element. The first optical element and the second optical element cooperatively project the laser beam towards an object.

12 Claims, 4 Drawing Sheets

(56) References Cited

U.S. PATENT DOCUMENTS

2015/0318012 A1* 11/2015 Hosaka ................ G11B 7/1392
                                                                  369/103
2017/0261846 A1* 9/2017 Maes ................... G03B 21/147
2019/0293954 A1* 9/2019 Lin ..................... G01B 11/2513

* cited by examiner

PROJECTION MODULE, IMAGING MODULE, AND ELECTRONIC DEVICE

FIELD

The subject matter herein generally relates to imaging technologies, and more particularly, to a projection module, an imaging module having the projection module, and an electronic device having the imaging module.

BACKGROUND 3D sensing modules of electronic devices usually have projection modules and receiving modules. The projection module can project light onto an object. The receiving module can receive the light reflected by the object. Then, depth information of the object can be obtained based on the reflected light.

The projection module may be stacked on a specific component of the electronic device, such as a display component or a housing. However, such stacking manner increase a thickness of the electronic device.

BRIEF DESCRIPTION OF THE DRAWINGS

Implementations of the present technology will now be described, by way of embodiment, with reference to the attached figures.

DETAILED DESCRIPTION

Figure 1:
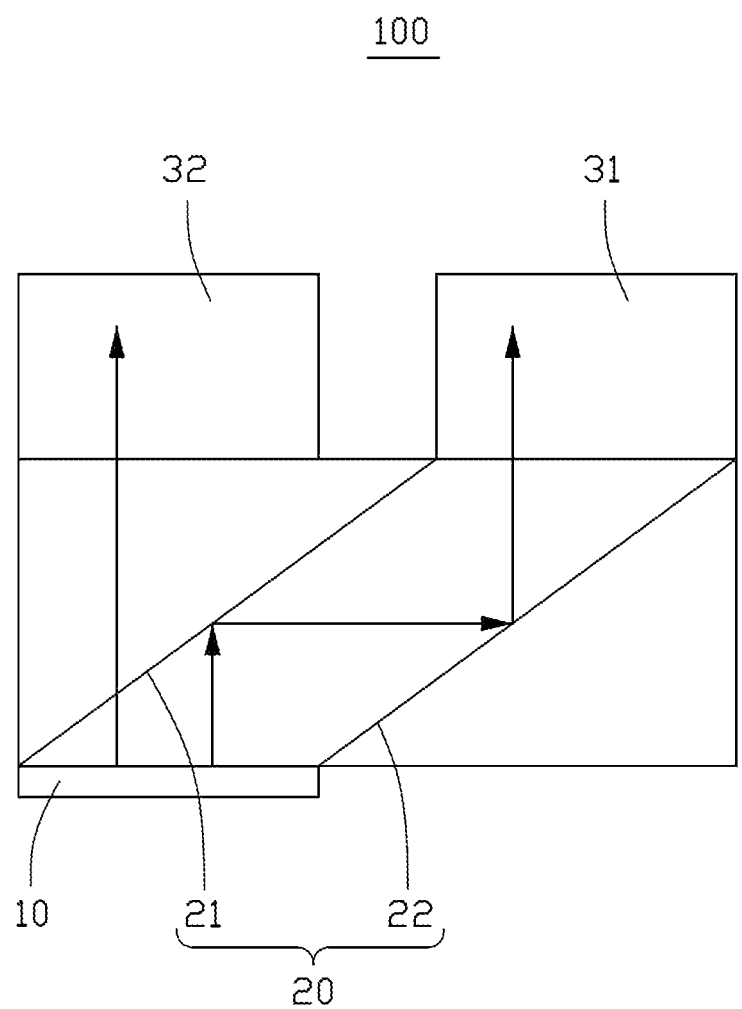
FIG. 1 is a diagrammatic view of an embodiment of a projection device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates an embodiment of a projection module 100. The projection module 100 includes a light source 10, a reflective structure 20, and an optical structure 30. The reflective structure 20 is disposed between the light source 10 and the optical structure 30.

The light source 10 can emit laser light. In an embodiment, the light source 10 can emit infrared laser light. The light source 10 may be a vertical cavity surface emitting laser (VCSEL). Since only a VCSEL is included, the projection module 100 can have a small size while ensuring a power of the laser light.

The reflective structure 20 includes a first reflective element 21 and a second reflective element 22. The optical structure 30 includes a first optical element 31 and a second optical element 32. The first reflective element 21 is disposed on a transmission path of the laser light from the light source 10. The first reflective element 21 can reflect a portion of the laser light towards the second reflective element 22, and transmits a remaining portion of the laser light towards the second optical element 32. The second reflective element 22 faces the first reflective element 21, and is disposed on a transmission path of the laser light reflected by the first reflective element 2. The second reflective element 22 can reflect the laser light from the first reflective element 21 towards the first optical element 31. The first optical element 31 can project the laser light from the second reflective element 22 towards the object to scan the object (for example, a human face). The second optical element 32 can project the laser light from the first reflective element 21 towards the object as supplement light, to assist the first optical element 31 to scan the object.

Thus, the first optical element 31 has an object scanning function, and the second optical element 32 has a light supplement function. By disposing the first optical element 31 and the second optical element 32 on the transmission paths of the laser light from the light source 10, the size of the projection module 100 can further be reduced.

In at least one embodiment, the first reflective element 21 and the second reflective element 22 are parallel to each other. The first reflective element 21 is a semi-transmissive reflective mirror. The second reflective element 22 is a total reflective mirror.

Figure 2:
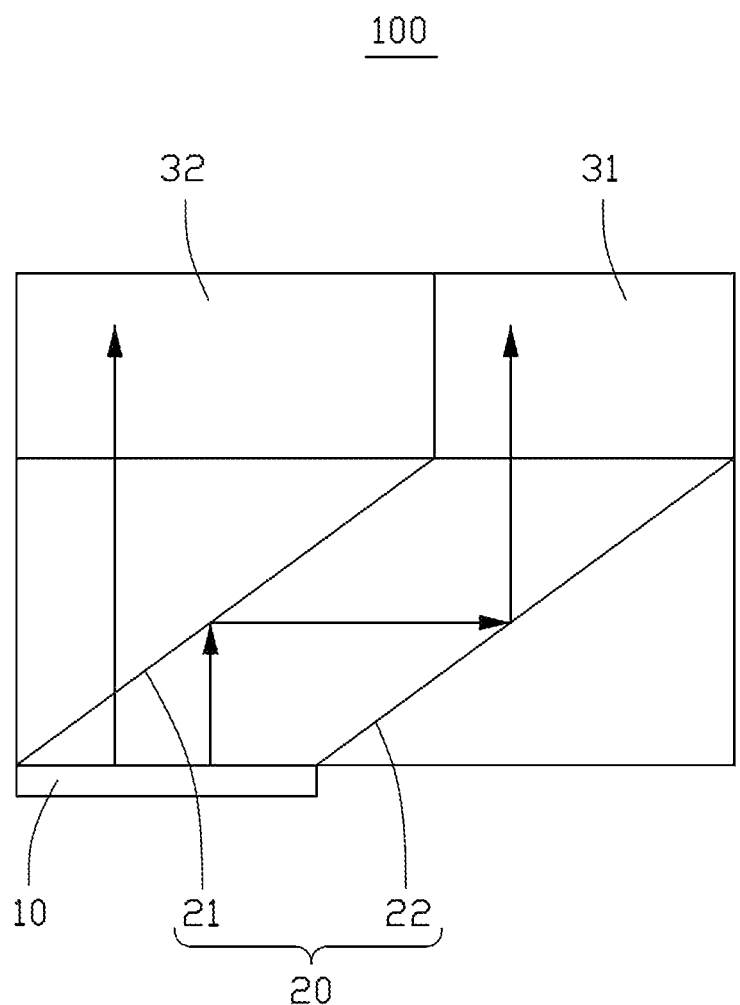
FIG. 2 is a diagrammatic view of another embodiment of a projection device according to the present disclosure.

Referring to FIG. 1, in at least one embodiment, the first optical element 31 and the second optical element 32 are spaced apart from each other. Referring to FIG. 2, in other embodiments, the first optical element 31 and the second optical element 32 are joined together.

In at least one embodiment, the first optical element 31 may be a diffractive optical element (DOE), and the second optical element 32 may be a diffuser.

In at least one embodiment, only one first optical element 31 and only one second optical element 32 are included. In other embodiments, at least two first optical elements 31 may be included, which are jointed to each other. At least two second optical elements 32 may be included, which are connected to each other. By setting at least two first optical elements 31 and/or at least two second optical elements 32, most of the laser light emitted by the light source 10 can be ensured to be received by the first optical elements 31 and/or the second optical elements 32, thereby improving utilization rate of the laser light.

Figure 3:
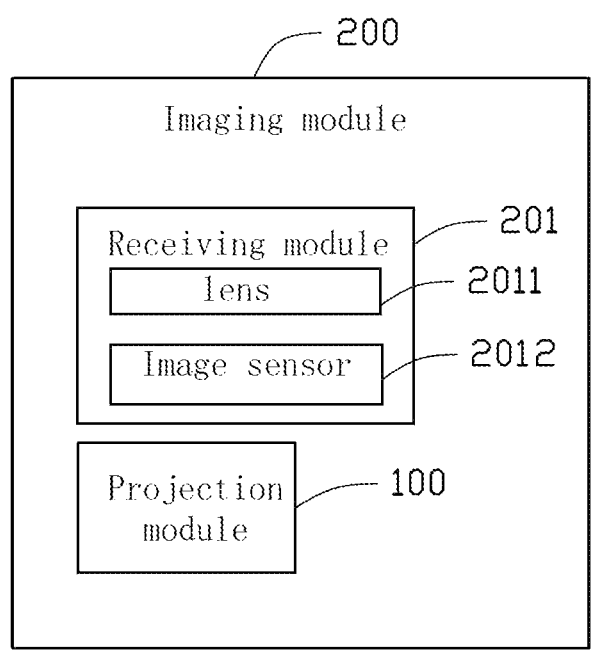
FIG. 3 is a block diagram of an embodiment of an imaging module according to the present disclosure.

FIG. 3 illustrates an embodiment of an imaging module 200. The imaging module 200 includes a receiving module 201 and the projection module 100. The receiving module 201 may include a lens 2011 and an image sensor 2012 on an image side of the lens 2011. The lens 2011 can receive the laser light reflected by the object, and converge the laser light towards the image sensor 2012. The image sensor 2012 can collect the laser light. The depth information (for example, 3D contour information) of the object can then be determined accordingly.

Figure 4:
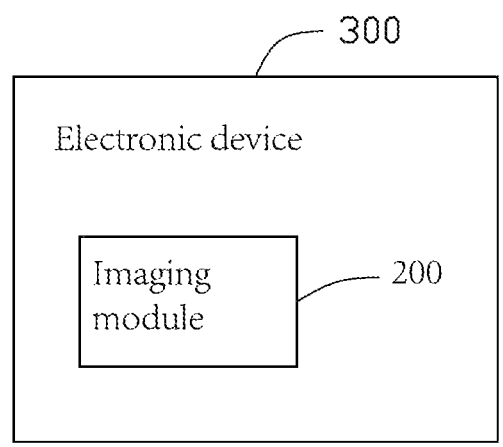
FIG. 4 is a block diagram of an embodiment of an electronic device according to the present disclosure.

FIG. 4 illustrates an embodiment of an electronic device 300. The electronic device 300 can be a mobile phone, a wearable device, a computer, or a vehicle.

When the imaging module 200 is applied to the electronic device 300, the projection module 100 can realize the object scanning function and light supplement function without adding other optical components. Thus, the size of the electronic device 300 can be reduced.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A projection module, comprising:
 a light source configured to emit laser light;
 a reflective structure comprising a first reflective element and a second reflective element; and
 an optical structure comprising a first optical element and a second optical element arranged side by side, wherein the first optical element comprises a first bottom surface and two first sidewalls connected to the first bottom surface, the second optical element comprises a second bottom surface and two second sidewalls connected to the second bottom surface, one of the two first sidewalls and one of the two second sidewalls are joined together;
 wherein the reflective structure is disposed between the laser source and the optical structure, the first reflective element reflects a portion of the laser light towards the second reflective element, and transmits a remaining portion of the laser light towards the second optical element; the second reflective element reflects the laser light from the first reflective element towards the first optical element, the first optical element is configured to project the laser light from the second reflective element towards an object to scan the object, and the second optical element is configured to project the laser light from the first reflective element towards the object as supplement light, to assist the first optical element to scan the object.

2. The projection module of claim 1, wherein the first reflective element and the second reflective element are parallel to each other.

3. The projection module of claim 1, wherein first reflective element is a semi-transmissive reflective mirror, and the second reflective element is a total reflective mirror.

4. The projection module of claim 1, wherein the first optical element is a diffractive optical element, and the second optical element is a diffuser.

5. An imaging module, comprising:
 a projection module comprising:
  a light source configured to emit laser light;
  a reflective structure comprising a first reflective element and a second reflective element arranged side by side, wherein the first optical element comprises a first bottom surface and two first sidewalls connected to the first bottom surface, the second optical element comprises a second bottom surface and two second sidewalls connected to the second bottom surface, one of the two first sidewalls and one of the two second sidewalls are joined together; and
  an optical structure comprising a first optical element and a second optical element, wherein the reflective structure is disposed between the laser source and the optical structure, the first reflective element reflects a portion of the laser light towards the second reflective element, and transmits a remaining portion of the laser light towards the second optical element; the second reflective element is configured to reflect the laser light from the first reflective element towards the first optical element, the first optical element the first optical element is configured to project the laser light from the second reflective element towards an object to scan the object, and the second optical element is configured to project the laser light from the first reflective element towards the object as supplement light, to assist the first optical element to scan the object; and
 a receiving module comprising a lens and an image sensor, the lens is configured to receive the laser light from the object and transmit the laser light to the image sensor.

6. The imaging module of claim 5, wherein the first reflective element and the second reflective element are parallel to each other.

7. The imaging module of claim 5, wherein first reflective element is a semi-transmissive reflective mirror, and the second reflective element is a total reflective mirror.

8. The imaging module of claim 5, wherein the first optical element is a diffractive optical element, and the second optical element is a diffuser.

9. An electronic device, comprising:
 an imaging module, comprising:
  a projection module comprising:
   a light source configured to emit laser light;
   a reflective structure comprising a first reflective element and a second reflective element arranged side by side, wherein the first optical element comprises a first bottom surface and two first sidewalls connected to the first bottom surface, the second optical element comprises a second bottom surface and two second sidewalls connected to the second bottom surface, one of the two first sidewalls and one of the two second sidewalls are joined together; and
   an optical structure comprising a first optical element and a second optical element, wherein the reflective structure is disposed between the laser source and the optical structure, the first reflective element reflects a portion of the laser light towards the second reflective element, and transmits a remaining portion of the laser light towards the second optical element; the second reflective element reflects the laser light from the first reflective element towards the first optical element, the first optical element the first optical element is configured to project the laser light from the second reflective element towards an object to scan the object, and the second optical element is configured to project the laser light from the first reflective element towards the object as supplement light, to assist the first optical element to scan the object; and
  a receiving module comprising a lens and an image sensor, the lens is configured to receive the laser light from the object and transmit the laser light to the image sensor.

10. The electronic device of claim 9, wherein the first reflective element and the second reflective element are parallel to each other.

11. The electronic device of claim 9, wherein first reflective element is a semi-transmissive reflective mirror, and the second reflective element is a total reflective mirror.

12. The electronic device of claim 9, wherein the first optical element is a diffractive optical element, and the second optical element is a diffuser.

\* \* \* \* \*